United States Patent [19]
Peterson

[11] Patent Number: 5,226,420
[45] Date of Patent: Jul. 13, 1993

[54] ULTRASONIC COLOR FLOW IMAGING USING AUTOREGRESSIVE PROCESSING

[75] Inventor: Roy B. Peterson, Redmond, Wash.

[73] Assignee: Advanced Technology Laboratories, Inc., Bothell, Wash.

[21] Appl. No.: 713,235

[22] Filed: Jun. 7, 1991

[51] Int. Cl.$^5$ .............................................. A61B 8/06
[52] U.S. Cl. ................................................. 128/661.09
[58] Field of Search ...................... 128/660.04–660.05, 128/661.08–661.10; 73/861.25

[56] References Cited

U.S. PATENT DOCUMENTS

| | | | |
|---|---|---|---|
| 4,719,923 | 1/1988 | Hartwell et al. | 128/661.08 |
| 4,759,374 | 7/1988 | Kierney et al. | 128/661.09 |
| 5,107,841 | 4/1992 | Sturgill | 128/661.09 |

OTHER PUBLICATIONS

Ahn, Y. B. et al "Estimation of Mean Frequency & Variance of UTS Doppler Signal by Using Second Order Autoregressive Model", IEEE Trans. on Ultrasonics, Ferroelectrics, & Freq. Control, vol. 38, No. 3, May 1991, pp. 172–181.

Loupas, T. et al, "Low-Order Complex AR Models for Mean and Max. Frequency Estimation in the Context of Doppler Color Flow Mapping", IEEE Trans. on UFFC, vol. 37, No. 6, Nov. 1990, pp. 590–601.

Schlindwein, F. S. "Selection of the Order of Autoregressive Models for Spectral Analysis of Doppler Ultrasound Signals", UTS in Med. & Biol., vol. 16, No. 1, pp. 81–91, 1990

Kaluzynski, K. "Order Selection in Doppler Flow Signal Spectral Analysis Using Autoregressive Modelling", Med. & Biol. Eng. & Comput., 1989, vol. 27, pp. 89–92.

Vaitkus, P. J. et al, "A Comparative Study and Assessment of Doppler Ultrasound Spectral Estimation Techniques Part I: Estimation Methods", UTS in Med. & Biol., vol. 14, No. 8, pp. 661–672 (1988).

Vaitkus, P. J. et al, "A Comparative Study and Assessment of Doppler Ultrasound Spectral Estimation Techniques Part II: Methods and Results", UTS in Med. & Biol., vol. 14, No. 8, pp. 673–688 (1988).

*Primary Examiner*—Francis Jaworski
*Attorney, Agent, or Firm*—W. Brinton Yorks, Jr.

[57] ABSTRACT

An ultrasonic color flow information processing system receives ultrasonic Doppler information signals which are used to develop a map of color flow display information of fluid flow. The system processes the Doppler information through autoregressive spectral estimation, which models the Doppler information as the output of an all-pole filter driven by white noise. For real-time utilization, the estimation of poles of the filter model is restricted to the estimation of two poles, one representative of tissue and one representative of fluid flow. The two poles and the white noise power parameter of the model are analyzed in accordance with certain criteria to select for display one of the poles as that representative of fluid flow.

11 Claims, 4 Drawing Sheets

ULTRASONIC COLOR FLOW IMAGING USING AUTOREGRESSIVE PROCESSING

This invention relates to ultrasonic diagnostic systems which present information concerning the velocity of fluid flow in a color modulated display and, in particular, to the processing of color flow velocity information by autoregressive modelling.

Color flow imaging is widely used in ultrasonic diagnostic ultrasound to present information concerning the velocity of fluids such as blood flow. In such imaging systems fluid velocity information is contained in received ultrasonic signals in Doppler encoded form. A number of Doppler signals received over time from a given image location, or range cell, are conventionally first processed by high pass filtering in what is commonly known as a wall filter or clutter rejection filter. This filter removes signal components returned from stationary and substantially stationary tissue which otherwise would interfere with the desired fluid velocity information. Next the mean frequency of the Doppler information is estimated using an autocorrelator. This mean frequency is interpreted as the velocity of the flowing fluid for display in the color flow image.

There are several problems inherent in this technique. First, while the clutter rejection filter is intended only to remove tissue signal components, its actual operation can also remove flow velocity information. Often this is due to considerations made in the design of the rejection band of the filter, where the desire to extend its operation to the removal of signals from slowly moving organs compromises its ability to pass signals from slowly flowing fluids. Second, the operation of the clutter rejection filter can distort the spectral content of the fluid velocity signals, which adversely affects the subsequent spectral estimation. Third, the usual real time color flow autocorrelator is designed to estimate the mean frequency of a clean, sharply peaked, symmetric spectrum; its operation is less than ideal in a domain of complex spectral characteristics, the usual characteristics encountered in ultrasonic color flow Doppler information processing.

In accordance with the principles of the present invention, these limitations of the prior art are overcome by processing the Doppler information signals for color flow display by autoregressive (AR) spectral estimation. The possibility of using AR techniques in ultrasound has been recognized in the past for various applications, but always with difficulties of implementation. For example, the use of AR spectral analysis techniques for spectral estimation in spectral Doppler applications has been widely considered in the literature. See, e.g., "A Comparative Study and Assessment of Doppler Ultrasound Spectral Estimation Techniques, Part I: Estimation Methods" and "Part II: Methods and Results" by P. J. Vaitkus, et al. (1988); "Order Selection in Doppler Blood Flow Signal Spectral Analysis Using Autoregressive Modelling" by K. Kaluzynski (1989); and "Selection of the Order of Autoregressive Models for Spectral Analysis of Doppler Ultrasound Signals" by F. S. Schlindwein (1990). Running through all of these papers is the difficulty in defining the order of the model needed to accurately define the Doppler spectrum, with recommendations running from an order of eight to an order of fifteen. The necessity to compute the model to such extensive orders has negative implications for the ability to perform AR spectral Doppler modelling in real time applications.

In accordance with a further aspect of the present invention, these difficulties of AR Doppler spectral analysis are overcome by recognizing certain objectives and making simplifying assumptions in the application of AR modelling to color flow Doppler. First is the recognition that the objective of color flow Doppler is to arrive at but a single result. From a sampling of data values of Doppler information relating to a particular range cell, it is necessary to produce only a single velocity value that may be translated into a pixel color at the image location of the range cell. Second, the problem of order selection is obviated by assuming that the detected Doppler signals will represent only four possible physiological conditions: that there is a fluid flow component present; that there is a tissue component present; that there are both a fluid flow component and a tissue component present; or that no Doppler component is present.

Based upon these recognitions and assumptions in accordance with the principles of the present invention, autoregressive spectral estimation of color flow Doppler information is performed by modelling the Doppler data as the output of an all-pole filter driven by white noise. The data is modelled by fitting an all-pole filter to the data samples by one of the recognized AR algorithms, a preferred one being the Burg method. Calculation of the algorithm is performed to only a second order, by reason of the assumption that a maximum of only two components will be present. The calculation thus yields three values, two filter poles, and the AR coefficient which is a measure of the white noise driving power of the model.

From the two filter poles, one may be chosen as the fluid flow parameter being sought, since the objective is to select but a single value for color flow display. A number of criteria are then applied to the two poles, such as the magnitudes of the poles, the deviation of the two poles from each other in the frequency domain, their deviation from a predetermined low cutoff frequency, the proximity of the two values to the origin in the frequency domain, and the magnitude of the white noise driving power. By application of criteria such as these, a single parameter, or none, is chosen as that of the fluid flow component for color flow display.

A further advantage of AR modelling in color flow estimation in accordance with the present invention is the elimination of the conventional clutter rejection filter and its replacement with a more precise technique for elimination of undesired tissue components and retention of the spectral components of fluid flow. In a preferred embodiment of the present invention, the full spectrum of Doppler signal components is used in the AR model, without any prior filtering for tissue components. The AR color flow spectral estimation thus involves all spectral components of both tissue and fluid flow, resulting in precise estimation of both poles in the frequency domain. Once the two poles have been precisely determined, the pole of the model representing the tissue component is analytically eliminated by application of one or some of the criteria described above. Thus, the unwanted component is precisely removed in the frequency domain, without the deleterious effects of spectral distortion and passband selection and shaping which are characteristic of the time domain filtering techniques of the prior art.

Figure 1:
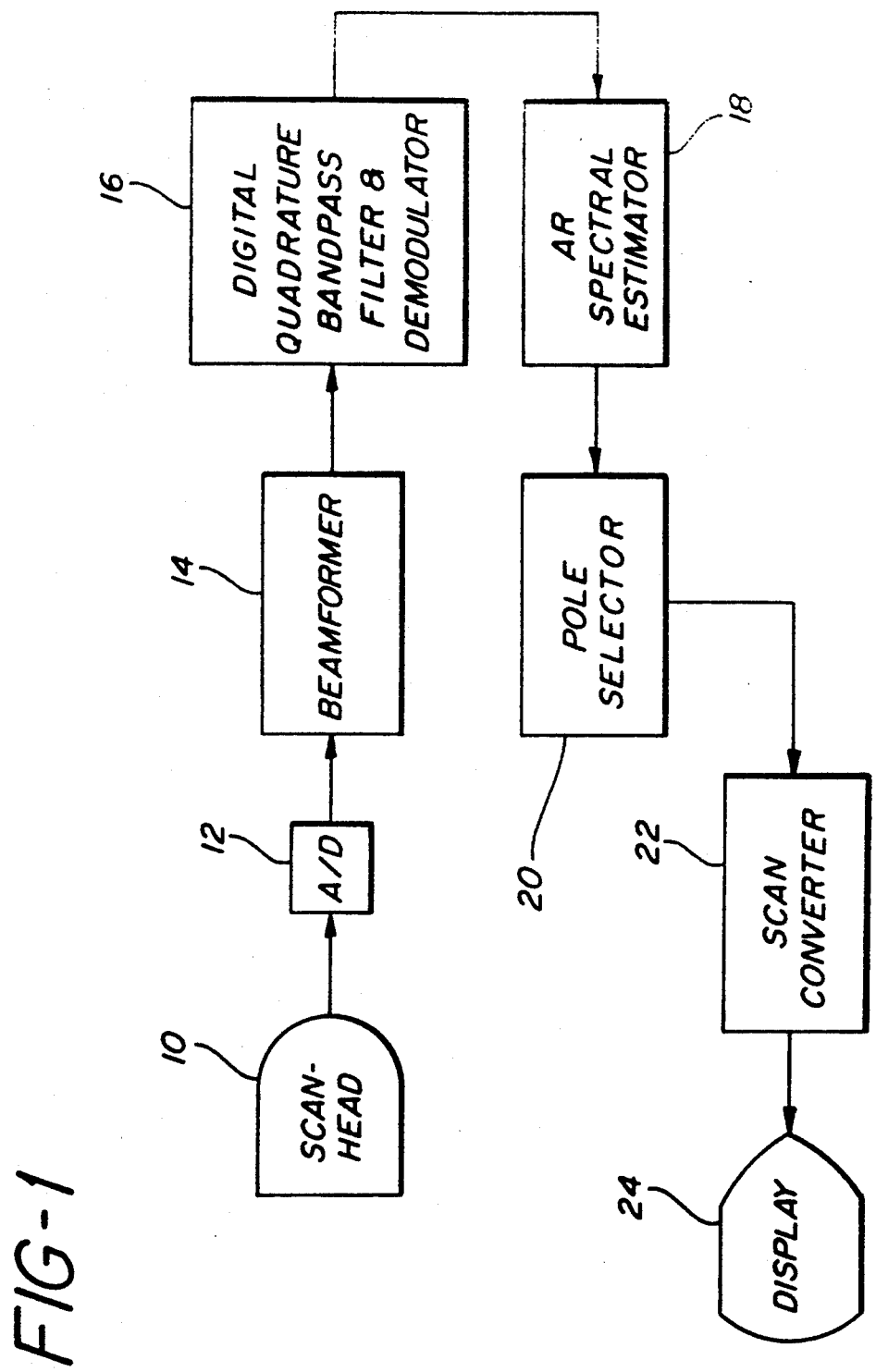
FIG. 1 illustrates in block diagram form an ultrasonic color flow Doppler signal processing system constructed in accordance with the principles of the present invention.

Referring first to FIG. 1, an ultrasonic diagnostic color flow system constructed in accordance with the principles of the present invention is shown in block diagram form. A scanhead 10 containing one or more piezoelectric transducer elements transmits ultrasonic waves into the body of a patient and receives ultrasonic echoes returned by the tissue and fluid structures of the body. The returning echoes are converted to electrical signals by the transducer(s) and the signals are then digitized by an analog to digital converter 12. A plurality of such digital signal samples are combined in a beamformer 14 to form coherent ultrasonic information signals which are coupled to a digital quadrature bandpass filter and demodulator 16. The fluid flow velocity information contained in the ultrasonic information signals is encoded as phase shifts of the returning echo signals in relation to a reference signal. Accordingly the filtering and demodulation process involves a translation of the ultrasonic information signals to an intermediate frequency range and the resolution of the phase information into two components, an in-phase (I) component and a quadrature (Q) component. The output of the digital quadrature bandpass filter and demodulator 16 thus is a stream of corresponding I and Q phase information signals containing information as to the velocity of fluids and tissue in the patient's body.

In accordance with the principles of the present invention, the phase information signals are applied to an autoregressive spectral estimator 18. The estimator 18 processes Doppler signal sample data by modelling the data as the output of an all-pole filter driven by white noise. This modelling is done by fitting an all-pole filter to the samples by iterative processing of the data in accordance with an established autoregressive algorithm, the preferred one being the Burg method. The iterative processing continues until two poles and the variance $\sigma^2$ are produced. The variance $\sigma^2$ is a measure of the white noise power of the model. In general, the variance of the model increases as the signal power increases.

The three values produced by the autoregressive spectral estimator 18 are supplied to pole selector 20, which processes the values in accordance with an algorithm that applies criteria, discussed in detail below, for the selection of one or none of the poles as that resulting from fluid flow. The location of the selected pole in the frequency domain represents the fluid velocity which is to be displayed by the color flow system.

The velocity information value produced by the pole selector 20 is then applied to a scan converter 22 where the velocity information value is translated to a color and an intensity and stored locationally as a function of the position in the scanned area of the body at which the measurement was taken. The scan converter 22 thus arranges the flow velocities in an image format suitable for a color flow image, and the image is then displayed on an image display 24.

Figure 2:
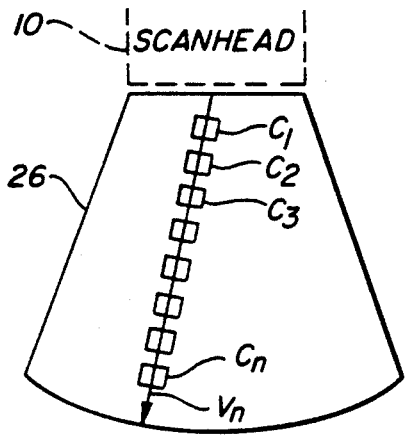
FIG. 2 illustrates an area being interrogated for Doppler flow information.

FIG. 2 depicts the manner in which Doppler data may be acquired to form a color flow image. The scanhead 10 sequentially transmits ultrasonic pulses in a plurality of vector directions over the scanned area 26 of the patient's body. One of these vector directions is indicated by arrow $V_n$ in FIG. 2. As echoes are returned from tissue and fluids along direction $V_n$, signal samples are taken from echoes returning from sequential positions along the vector. These positions are referred to herein as range cells, some of which are labelled $C_1$, $C_2$, $C_3$, ... $C_n$ in the FIGURE. This sequence of pulse transmission and echo reception from the range cell locations is repeated a number of times along vector direction $V_n$. The acquired signal samples are processed by the beamformer 14 and converted by the digital quadrature bandpass filter and demodulator 16 to I and Q quadrature signal samples for processing by the autoregressive spectral estimator 18.

Figure 3:
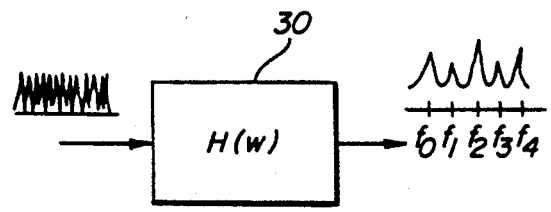
FIG. 3 illustrates the transfer function of an autoregressive spectral estimator.

A block diagram illustrating the principle of autoregressive estimation is shown in FIG. 3. The block 30 represents an all-pole filter having a transfer function $H(\omega)$ to which white noise having a power of $\sigma^2$ is applied as an input. As a result of the transfer function $H(\omega)$, the output exhibits a filtered response having poles $f_0, f_1, f_2, \ldots$, which model the response exhibited by the data set being modelled. The number of poles of the transfer function, the filter function parameters, is the order of the filter function; a seventh order model would have seven poles, for instance. The more complex the response characteristic of the data set being modelled, the greater the number of poles (the higher the order) required to accurately model the data.

Figure 4A:
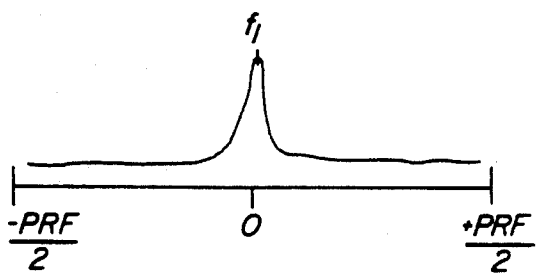
FIGS. 4a–4d illustrate four Doppler spectra containing components of the type which are to be processed by autoregressive spectral estimation in accordance with the principles of the present invention.
Figure 4B:
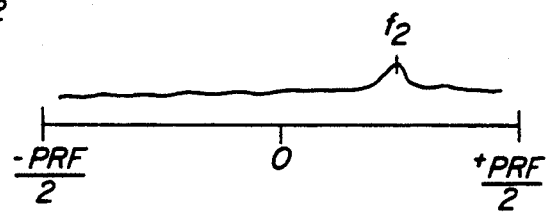
Figure 4C:
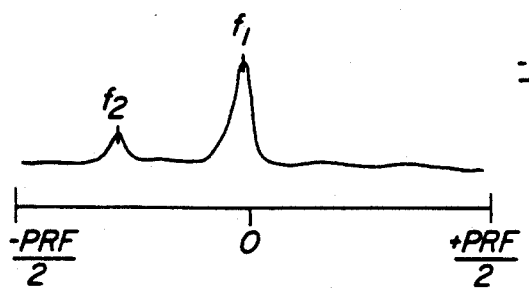
Figure 4D:
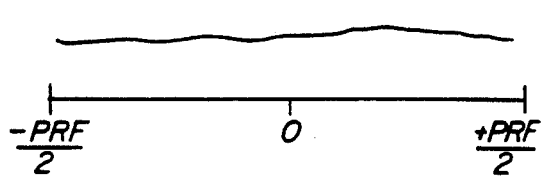

As mentioned above the practicality of the use of autoregressive estimation for color flow is premised on the assumption that only four signal conditions will be encountered, which are diagrammatically illustrated by FIGS. 4a–4c. In each of these FIGURES the signal components are represented in the frequency domain, centered about a nominal zero (rest) frequency and bounded by the Nyquist limits of the Doppler signal sampling rate, $+PRF/2$ and $-PRF/2$, where PRF is the pulse rate frequency of the interrogating signal. FIG. 4a shows a single component centered about frequency $f_1$ at approximately the zero frequency of the spectrum. This type of response would be expected when the only signals being received are from tissue which is substantially at rest. FIG. 4b also shows a single component centered about frequency $f_2$ and located some distance from the zero frequency. This type of response would be expected when the only signals being received are from a moving fluid removed from nearby tissue, such as would be returned from blood flow at the center of a chamber of the heart. FIG. 4c illustrates two components $f_1$ and $f_2$, located near and remote from the zero frequency, respectively. Such a response would be encountered when measuring blood flow near the wall of a vessel or the heart, when Doppler signal components would be expected from both the tissue of the vessel and blood flow. Finally, FIG. 4d illustrates a condition in which no Doppler signals are returned, as would be the case when no structure at all is at the location of the measurement and only noise is returned by the transducer. By assuming that only these four signal conditions will occur, operation of the AR spectral estimator 18 can be restricted to second order computations as shown below, and the use of autoregressive modelling for real time applications becomes feasible and, as will be seen, beneficial.

In a preferred embodiment of the present invention the autoregressive spectral estimator 18 uses the Burg algorithm to model the Doppler data from each range cell location. From the assumption that the data will have a maximum of two poles, one for fluid flow and one for tissue, a second order model of the data is estimated by the algorithm. The Doppler data from one range cell is of the form $x = \{x[0], x[1], \ldots, x[N-1]\}$, where N is the number of data samples and $x[n] = a_n + jb_n$. The prediction error power is initialized to $\rho_0 = r_{xx}[0]$, where $$r_{xx}[0] = \frac{1}{N} \sum_{n=0}^{N-1} |x[n]|^2.$$

The forward and backward prediction error time series are initialized as follows:

$$e_0^f[n] = x[n]; n=1,2,\ldots,N-1 \text{ and}$$

$$e_0^b[n] = x[n]; n=0,1,\ldots,N-2$$

From these initialized values the first reflection coefficient is calculated as follows:

$$k_1 = \frac{-2 \sum_{n=1}^{N-1} e_0^f[n] e_0^{b*}[n-1]}{\sum_{n=1}^{N-1} (|e_0^f[n]|^2 + |e_0^b[n-1]|^2)}.$$

The prediction error power is calculated as $\rho_1 = (1 - |k_1|^2)\rho_0$, and the AR parameter is $a_1[1] = k_1$. From these calculations the forward and backward prediction errors are recalculated:

$$e_1^f[n] = e_0^f[n] + k_1 e_0^b[n-1]; n=2,3,\ldots,N-1 \text{ and}$$

$$e_1^b[n] = e_0^b[n-1] + k_1^* e_0^b[n]; n=1,2,\ldots,N-2$$

Now the second reflection coefficient is calculated as follows:

$$k_2 = \frac{-2 \sum_{n=2}^{N-2} e_1^f[n] e_1^{b*}[n-1]}{\sum_{n=2}^{N-1} (|e_1^f[n]|^2 + |e_1^b[n-1]|^2)}.$$

The white noise driving variance is calculated as $\rho_2 = (1 - |k_2|^2)\rho_1$, and the AR parameters are $$a_2[1] = a_1[1] + k_2 a_1^*[1] \text{ and}$$

$$a_2[2] = k_2$$

The poles of the filter are the roots of the second order denominator polynomial of the filter function:

$$\text{filter}(f) = 1/(1 + a_2[1]e^{-j\omega} + a_2[2]e^{-j2\omega}),$$

where $\omega = 2\pi f$. The roots of the second order polynomial are computed using $$\text{roots} = (-a_2[1] \pm \sqrt{a_2[1]^2 - 4a_2[2]})/2a_2[2].$$

The results are
root[1] = $a + jb$, and
root[2] = $c + jd$

From these roots the frequencies of the filter poles, normalized to the pulse repetition frequency, are calculated as $$f_1 = (\arctan(b/a))/2\pi \text{ with a magnitude of } \sqrt{a^2 + b^2}$$

and $$f_2 = (\arctan(d/c))/2\pi \text{ with a magnitude of } \sqrt{c^2 + d^2}.$$

The white noise driving variance or power is $\rho_2$, which is the variance $\sigma^2$.

Once the two poles have been estimated by autoregressive modelling as described above, the pole information and the white noise power value are applied to the pole selector 20 for selection of the pole representing fluid flow. The operation of the pole selector 20, which analyzes the pole and white noise power data using one or more algorithms, is illustratively shown in FIGS. 5a–5e which are unit circle drawings depicting the same information as FIGS. 4a–4d. In FIGS. 5a–5e the nominal zero frequency is at the right side of the abscissa and the Nyquist limits are at the left side of the abscissa. Rotational distance around the circle and proceeding from the zero frequency axis represents values in the sampling frequency domain. Magnitude is represented by the distance of the poles from the origin of the axes. The pole selector 20 analytically performs the analysis represented by these FIGURES.

Figure 5A:
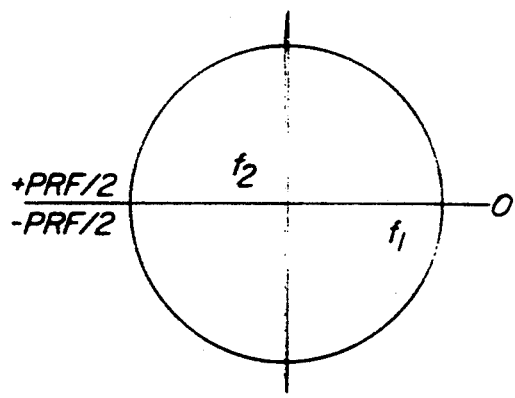
FIGS. 5a–5e are unit circle drawings of exemplary pole locations which illustrate criteria for selecting the pole representing fluid flow.

FIG. 5a illustrates two poles $f_1$ and $f_2$ which have been located by the AR spectral estimator 18. The pole selector 20 will note that pole $f_1$ is greater in magnitude (further from the origin) than pole $f_2$, and that pole $f_1$ is lower in frequency (closer to the nominal zero frequency axis) than pole $f_2$. These two characteristics are consistent with the determination that pole $f_1$ is that of a tissue component in the spectrum and that pole $f_2$ is a fluid flow velocity component. FIG. 5a is therefore similar in these characteristics to the condition represented by FIG. 4c. Accordingly the pole selector 20 will select pole $f_2$ for entry into the scan converter and subsequent display at its range cell coordinate location in the color flow display.

Figure 5B:
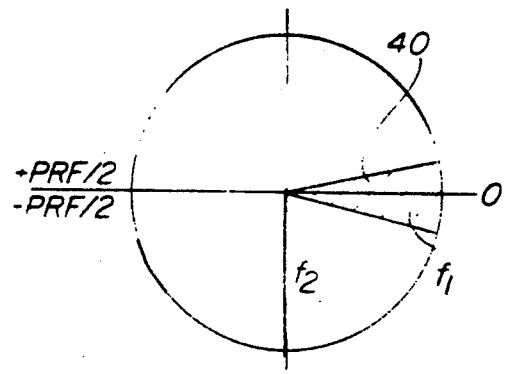

FIG. 5b again illustrates two poles $f_1$ and $f_2$ which have been located by the AR spectral estimator 18. FIG. 5b also contains a cross-hatched area 40 on the unit circle which is centered about the zero frequency axis. The boundaries of the area 40 sharply delineates the stop band of a wall filter in the sampling frequency domain. The relative magnitudes and frequency locations of the poles support the determination that pole $f_1$ is that of a tissue component and that pole $f_2$ is a fluid flow velocity component, a determination that is conclusively established by the location of pole $f_1$ within the boundaries of the wall filter stop band. Hence pole $f_1$ is rejected and pole $f_2$ is transmitted to the scan converter for color flow display.

Figure 5C:
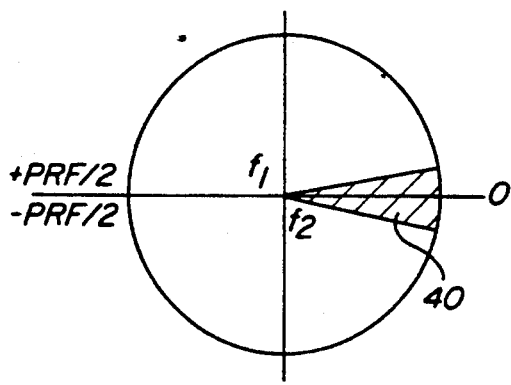

FIG. 5c illustrates a case where two poles $f_1$ and $f_2$ are estimated. Both are located outside the stop band 40 of the wall filter. However, their negligible magnitudes place them adjacent to the origin of the unit circle plot. The negligible magnitudes of the two poles lead to the determination that they both resulted from statistical characteristics of noise, as might result from AR analysis of the spectrum of FIG. 4d. Accordingly, both poles would be rejected by the pole selector 20, and neither value would be transmitted for display.

Figure 5D:
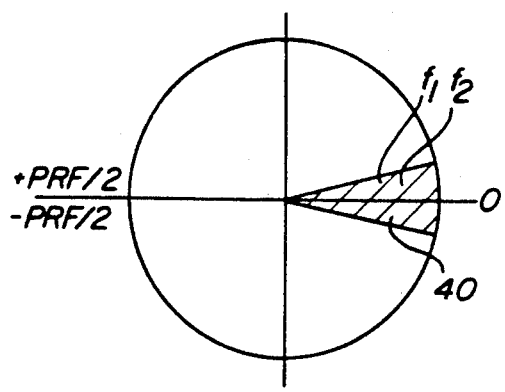

FIG. 5d illustrates a case where two poles $f_1$ and $f_2$ have been estimated and located within the stop band 40 of the sampling frequency domain wall filter. In addition, the two poles are seen to be in close proximity to each other in the sampling frequency domain. These factors lead to a rejection of both poles for display, as the poles most likely both result from the same tissue component. Such a result might arise for instance from a spectrum similar to that of FIG. 4a, when the tissue component exhibits a complex, multi-peaked spectral characteristic.

Figure 5E:
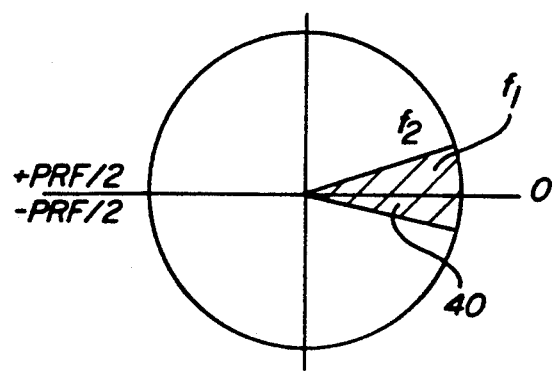

FIG. 5e illustrates a case where two poles $f_1$ and $f_2$ have been estimated and located, one within the stop band 40 of the sampling frequency domain wall filter and the other outside the stop band. In addition, the two poles are within a predetermined, close proximity to each other. Even though pole $f_2$ is outside the stop band 40, the close proximity of the two poles in the sampling frequency domain leads to the same determination as in the case of FIG. 5d. The result of the AR spectral estimation is two estimations of the same tissue component. Hence, no value is transmitted for display in this case.

FIG. 5e illustrates an advantage of the processing technique of the present invention as compared with a conventional color flow system with a standard time domain clutter rejection filter. In FIG. 5e the two poles are in close proximity to each other in the sampling frequency domain and close to the stop band of the sampling frequency domain wall filter. Were this the case with the standard clutter rejection filter, the low frequency spectral portion of the component $f_2$ outside the stop band would be distorted or eliminated by the transition band of the clutter rejection filter. This would result in inaccurate detection and processing of the spectral information. However, in an embodiment of the present invention no Doppler components are eliminated prior to autoregressive spectral modelling, and all detected components relating to both poles are used in the autoregressive processing. Thus an embodiment of the present invention results in more precise color flow representation of low flow velocity conditions than the conventional arrangements of the prior art.

Figure 5F:
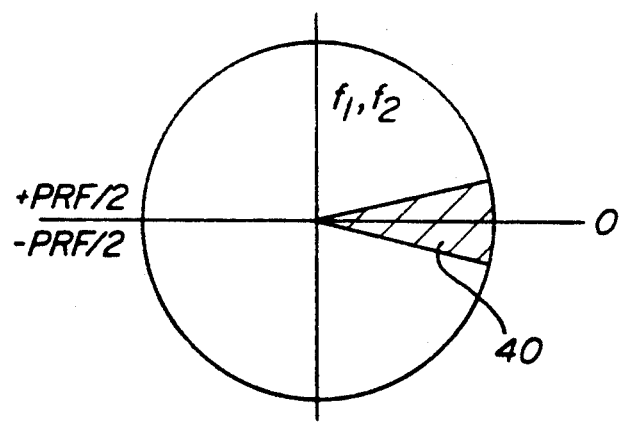

FIG. 5f illustrates a case where two poles $f_1$ and $f_2$ have been estimated and located well outside the stop band 40. As in the previous cases, the two poles are again in close proximity to each other. The significant distance between the poles and the stop band in the sampling frequency domain leads to a determination that flow is being represented. Moreover, because the two poles are within a predetermined distance of each other in the sampling frequency domain, the determination is made that both poles are derived from the same fluid flow component. Hence, the value of one of the poles or a combination of the two is transmitted for color flow display. In a preferred embodiment the values of $f_1$ and $f_2$ are averaged and the average value is used for display.

Figure 5G:
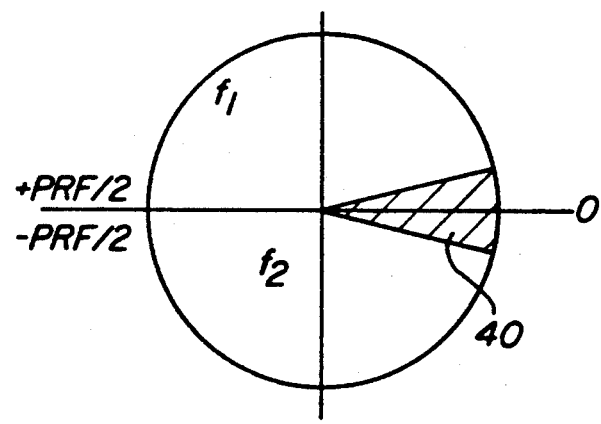

FIG. 5g illustrates a case where two poles have been estimated, and both are more than the predetermined threshold distance from the stop band 40. Hence, both poles are potential fluid flow component poles. The pole which is used for display is pole $f_1$, the pole with the larger magnitude. Possible explanations of this condition are that pole $f_2$ represents noise, or a flow or tissue component detected by an off axis sidelobe of the ultrasonic beam pattern.

In all of the above cases the white noise power parameter $\sigma^2$ produced by the autoregressive spectral estimation plays a role in the determination by the pole selector 20 of values to be transmitted for display. Since the white noise power parameter is a measure of the power of the spectral components, $\sigma^2$ is compared with a predetermined noise threshold. If the value of $\sigma^2$ is below the noise threshold, then the poles are assumed to be noise-related and no value is transmitted for color flow display.

What is claimed is:

1. An ultrasonic color flow information processing system comprising:
   means for receiving Doppler information signals:
   means for calculating two pole values by processing said Doppler information signals through autoregressive spectral estimation:
   means for processing said pole values to determine a value for display purposes; and
   means, responsive to said processing means, for producing a color flow map of said Doppler information signals.

2. The ultrasonic color flow information processing system of claim 1, wherein said calculating means includes means for modeling said Doppler information as the output of an all-pole filter driven by white noise.

3. The ultrasonic color flow information processing system of claim 2, wherein one of said pole values represents the velocity of fluid flow and wherein said processing means includes means for determining a value for display purposes which is representative of the velocity of fluid flow.

4. The ultrasonic color flow information processing system of claim 3, wherein said calculating means further includes means for producing an autoregressive coefficient which is a measure of the white noise driving power of the model.

5. The ultrasonic color flow information processing system of claim 4, wherein said processing means includes means for producing no value for display purposes when said autoregressive coefficient is less than a predetermined threshold value.

6. The ultrasonic color flow information processing system of claim 3, wherein said receiving means includes means for receiving Doppler information signals in correspondence to a given sampling frequency; and said calculating means includes means for estimating said two pole values referenced to a nominal zero frequency in the sampling frequency domain.

7. The ultrasonic color flow information processing system of claim 6, wherein said processing means includes means for selecting the pole value which is the most distant from said nominal zero frequency for display purposes.

8. The ultrasonic color flow information processing system of claim 6, wherein said processing means includes means for rejecting for display purposes a pole value which is within a band of sampling frequencies located about said nominal zero frequency.

9. The ultrasonic color flow information processing system of claim 8, wherein said processing means includes means for selecting, from among two pole values which are outside said band of sampling frequencies, that pole which exhibits the greatest magnitude.

10. The ultrasonic color flow information processing system of claim 6, wherein said processing means includes means for rejecting for display purposes a pole value which is less than a predetermined magnitude.

11. The ultrasonic color flow information processing system of claim 6, wherein said processing means includes means for producing for display purposes a value which is a combination of two pole values which are within a predetermined frequency distance of each other.

* * * * *